United States Patent Office 2,924,582
Patented Feb. 9, 1960

2,924,582
VINYL CHLORIDE RESIN COMPOSITIONS, STABILIZED AND PLASTICIZED WITH EPOXY COMPOUNDS

Dennis H. Mullins, St. Albans, and Benjamin Phillips and Frederick C. Frostick, Jr., Charleston, W. Va., assignors to Union Carbide Corporation, a corporation of New York No Drawing. Application December 31, 1957
Serial No. 706,306
5 Claims. (Cl. 260—30.4)

This invention relates to plasticized and heat and light stabilized polymer compositions and has for an object the provision of improved polymer compositions in which the heat and light stabilizers also act as plasticizers and thus serve as combination plasticizers and stabilizers. More particularly, this invention is directed to plasticized vinyl halide polymers and to heat and light stabilized vinyl halide polymers.

Like many other resins and resin-like materials, the vinyl halide resins form the basis of various plastic compositions in which they are associated with other substances which modify their properties in some desirable manner. For example, the vinyl resins may be compounded with various softening substances of low volatility which act as plasticizers to form softened compositions of increased resilience and flexibility. In common with most related compositions, the plasticized vinyl halide resins generally become increasingly softer and the heat softening temperature of the compositions is reduced as the amount of plasticizers in the composition is increased. Also, it is quite usual for these softened compositions to exhibit an increased tendency toward tackiness as the quantity of plasticizer is increased, and this quality is almost invariably present when the plasticized compositions are additionally softened by heat. The effect of plasticizers on the physical properties of finished plastic products containing the same is indeed an important part of the success of plastic products in industry today.

With the increasing demand for plastic products and plastic-containing products in a wide variety of industrial applications, many changes have been made by the plastics manufacturer to keep pace with the demand for new and useful plastic products.

High-speed, high-temperature processing of vinyl halide resin compositions, and their increasing use in outdoor applications, such as garden hose, automotive upholstery, automobile convertible tops, agricultural irrigation accessories, agricultural goods and implements and the like have placed increasing demands for better plasticizers and stabilizers for use in vinyl halide resin compositions to alleviate certain shortcomings inherent in these resins. One of the most serious problems is the deteriorating effects of heat and light upon vinyl halide resin compositions. These deleterious effects are manifested by discoloration and loss of mechanical strength of the resin composition.

In the case of plasticized vinyl halide resins, the problem may be further aggravated by instability on the part of the plasticizer and this condition may result in unsightly and troublesome exudation that has an adverse effect on the physical properties and appearance of the composition. Exudation of the plasticizer is very often the result of alterations in the chemical structure of the plasticizer, through attack by the degradation products of the resin, or by the action of sunlight or the combined action of both. Thus, not only is there a need for adequate stabilizataion of the resin against the effects of heat and light, but the plasticizer as well may require some protection.

On the other hand, a compound that exhibits good heat-stabilizing ability with vinyl halide resins may be relatively ineffective as a light stabilizer. For certain applications, particularly those utilizing plasticized, transparent, vinyl halide compositions, a highly desirable stabilizer would be one that possesses ability to plasticize as well as stabilize against both heat and light. Some progress, in this direction, has been made in recent years with the discovery that certain epoxidized natural oils are attractive plasticizer-stabilizer combinations for polyvinyl chloride and some vinyl chloride-containing copolymers but, however, it has been shown that resin compositions utilizing epoxidized natural oils are limited in their uses since they are not entirely compatible with vinyl chloride polymers and destruction of epoxidized natural oil by the degradation products of the resin causes exudation from the resin composition.

It is a principal object, therefore, to provide resin compositions which are markedly superior to resin compositions containing epoxidized natural oils.

It has been discovered that this and other objects of the invention can be readily accomplished by intimately associating with vinyl halide compositions an amount of an epoxide represented by the following general formula:

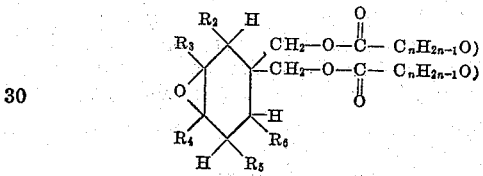

wherein $R_2$ through $R_6$ represent hydrogen atoms or lower alkyl groups and the group $(C_nH_{2n-1}O)$ represents an epoxyalkyl group composed of carbon, hydrogen and one oxygen atom attached to vicinal carbon atoms containing $n$ carbon atoms and $2n-1$ hydrogen atoms where $n$ represents a positive integer in the range of from 2 through 17. As used herein, the term "lower alkyl" is intended to include saturated aliphatic hydrocarbon radicals containing from one through eight carbon atoms such as methyl, ethyl, propyl, isopropyl, n-butyl, sec-butyl, tertiary-butyl, amyl, hexyl, heptyl, 2-ethylhexyl and octyl groups.

It has been discovered that not only are the epoxides, herein disclosed, useful as plasticizers for vinyl halide resins but are also useful as heat and light stabilizers as well.

The plasticizers and stabilizers of this invention are prepared by the reaction of peracetic acid and a 3-cyclohexene-1,1-dimethanol bis(alkenoate). The reaction whereby these compounds are prepared can be illustrated by the following general formula:

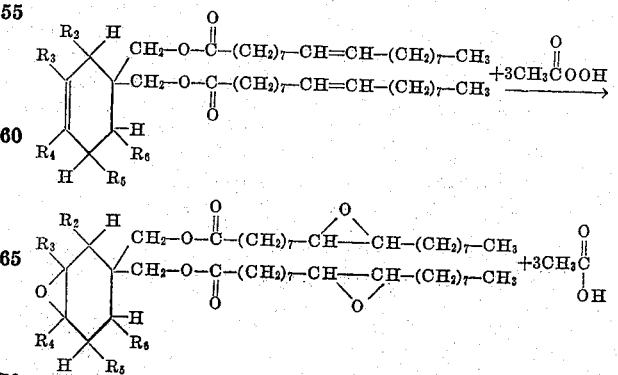

wherein the radicals $R_2$ through $R_6$ are as above defined.
The process of producing the plasticizers and stabilizers is carried out at temperatures in the range of from −25° C. to 150° C. At lower temperatures, the rate of epoxidation is slow. At higher temperatures, the rate of epoxidation is faster, but precautions are necessary to prevent the further reaction of the epoxide groups. Temperatures in the range of from 10° C. to 90° C. are preferably used to provide a suitable reaction rate to avoid undesired side reactions. The triene starting material is conveniently charged to a reaction vessel and the theoretical quantity of peracetic acid is then added. Three or more mols of peracetic acid per mol of triene are usually added to the triene starting material. Both types of double bonds in the molecule are relatively easily attacked by the peracetic acid and the epoxidation of both types appears to proceed simultaneously. The reaction is allowed to proceed until approximately the theoretical amount of peracetic acid is consumed, which is determined by periodic tests for peracetic acid. The time of reaction is usually from about one to ten hours, depending on the temperature. In working up the crude reaction product it is preferred, although not absolutely necessary, to separate the by-product acetic acid from the epoxide rapidly, since the by-product acetic acid will react with the epoxide to form undesired products thus decreasing the overall yield of triepoxide product. The reaction mixture is then subjected to conventional recovery procedures for the recovery of the triepoxide product. The product can be recovered by extraction with a suitable solvent; continuous distillation or distillation under reduced pressures as desired, or a residue product may be taken.

The starting materials for the production of the triepoxide plasticizers and stabilizers are the corresponding triolefins which may be represented by the following general formula:

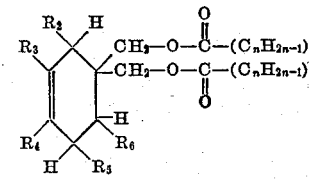

wherein the radicals $R_2$ through $R_6$ are as above defined and the group $(C_nH_{2n-1})$ represents an olefinic hydrocarbon group containing $n$ carbon atoms and $2n-1$ hydrogen atoms where $n$ represents a positive integer in the range of from 2 through 17. These starting materials are prepared by esterification of a 3-cyclohexene-1,1-dimethanol with a monoethylenically unsaturated aliphatic fatty acid. The cycloaliphatic alcohols are generally obtained by the reaction of the corresponding 3-cyclohexenecarboxaldehyde (prepared by the Diels-Alder reaction of butadiene or a substituted butadiene with acrolein, crotonaldehyde, methacrolein and the like) with excess formaldehyde in the presence of a base catalyst such as potassium hydroxide as described by H. E. French and D. M. Gallagher in J.A.C.S., 64, 1497 (1942). A variety of cycloaliphatic aldehydes suitable for reaction with formaldehyde to form the corresponding 3-cyclohexene-1,1-dimethanols can be produced having alkyl substituents contained in the ring when compounds such as acrolein, crotonaldehyde and methacrolein are reacted with dienes such as butadiene, piperylene, isoprene, 2,3-dimethyl-1,3-pentadiene, and the like.

The preferred 3-cyclohexene-1,1-dimethanols which contain alkyl groups attached to the cyclohexene ring are those with alkyl substituents having from one to four carbon atoms in the alkyl chain such as, for example, methyl, ethyl, propyl, isopropyl, butyl, isobutyl, tertiary butyl groups and the like.

Particularly preferred 3-cyclohexene-1,1-dimethanols to be used in producing the epoxy plasticizers and stabilizers are 3-cyclohexene-1,1-dimethanol and the methyl substituted 3-cyclohexene-1,1-dimethanols which include representative compounds such as 2-methyl-3-cyclohexene-1,1-dimethanol and 6-methyl-3-cyclohexene-1,1-dimethanol.

The monoethylenic fatty acids which are suitable for use in preparing the starting compounds are derived from any animal, vegetable or marine oils containing unsaturated fatty acids or they may be derived from the mixed fatty acids contained in such oils. More particularly, the monoethylenic fatty acids used in producing the epoxy plasticizers and stabilizers are those fatty acids containing from ten through eighteen carbon atoms. A variety of acids containing from three through eighteen carbon atoms are available and include for example, acrylic acid, methacrylic acid, crotonic acid, butenoic acids, hexenoic acids, decenoic acids, undecenoic acids, octadecenoic acids and the like. Preferred monoethylenic fatty acids to be used in producing the epoxy plasticizers and stabilizers are oleic acid, elaidic acid, myristoleic acid, palmitoleic acid, ricinoleic acid and erucic acid and mixtures of these acids.

The degree of protection that these novel plasticizer and stabilizer epoxides confer upon vinyl halide resin compositions is related to the concentration of the epoxy compound in the resin composition. It has been discovered that as little as 0.5 percent by weight based on the resin of the epoxide will confer desirable, beneficial effects upon the vinyl halide resin composition.

It has also been discovered that the epoxides can be used alone or in conjunction with other plasticizers. When it is desired to use the epoxide as a plasticizer, it has been discovered that the amount of epoxide is not narrowly critical. As little as 0.1 part by weight (0.001 percent by weight) of epoxide per hundred parts of resin will impart a noticeable difference in the desired degree of flexibility and confer some protection against embrittlement at low temperature and the degradative effects of exposure to heat and light. However, the majority of plasticized vinyl chloride resin compositions are based on mixtures of plasticizers in order to obtain the desired properties in the finished items and it has been found that the epoxides disclosed herein can be used effectively in conjunction with conventional plasticizers. The presence of these epoxides adds measurably to the heat and light stability of the vinyl halide resin composition in addition to contributing towards the flexibilizing of these compositions.

Where stabilization of a vinyl halide composition is the primary objective, with little or no interference with other properties, concentrations of epoxides in the range of from 1.5 to 8 parts by weight per hundred parts of resin have been found to be adequate. In specific applications requiring freedom from color drift during processing, such as in transparent films, it is sometimes necessary to use auxiliary cadmium-containing stabilizers in conjunction with the epoxides. Also, it has been found that synergism is exhibited when cadmium-barium compounds are used in conjunction with the epoxides in resin compositions.

The vinyl halide resins which can be satisfactorily plasticized and stabilized by the epoxides herein disclosed can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers. Preferred vinyl halide resins are the polyvinyl chloride resins and resins containing a major amount of copolymerized vinyl chloride.

The plasticizer-stabilizers of this invention may be employed alone or with other plasticizers in vinyl chloride compositions to obtain the desired results. It is particularly advantageous to employ these plasticizers and stabilizers in conjunction with other commercial plasticizers and the like since it permits the obtainment of highly desirable efficiency through the joint use of a relatively small amount of a highly efficient, more expensive epoxide compound as stabilizer and a relatively large amount of a less efficient, less expensive commercial plasticizer without sacrificing the desired effects. As noted hereinbefore, the incorporation of epoxides, disclosed herein, into vinyl halide compositions, in conjunction with cadmium and cadmium-barium compounds produces a synergistic stabilizing effect. In other words, the stabilizing effect produced by the use of two different substances in combination is considerably greater than the sum of the stabilizing effects expected from use of either substance alone.

In preparing specimens for evaluation of the compositions for flexibility, resistance to embrittlement at lower temperatures and resistance to the deteriorative effects of heat and light, a basic recipe comprising a vinyl halide resin is mechanically mixed with various amounts of the epoxy compounds, defined by the general formula set forth above, with or without a supplementary plasticizer such as dioctyl phthalate and the resulting mixtures fluxed and milled on a heated, laboratory, differential speed two-roll mill. The surface temperature of the rolls is maintained at 158° C. generally but higher temperatures, in the neighborhood of 170° C., can be employed.

The heat-stabilizing ability of the epoxy compounds is determined by both static and dynamic methods. When the heat-stabilizing ability is to be determined by the static method, samples of the fluxed sheet are mounted on a stainless steel wire mesh screen and placed in a circulating air oven wherein the temperature is maintained at about 158° C. Samples are then withdrawn at approximately thirty-minute intervals and discoloration, with respect to the original sheet, is determined by means of a Photovolt Reflection Meter, model 610, equipped with a Wratten C-5 blue filter. The color is reported as percent blue-light reflectance (percent BLR) as determined with the transparent sheet mounted on a block of magnesium carbonate which reflects 100 percent of the incident beam of blue light.

The dynamic heat-stability test is conducted in a manner similar to the static heat-stability test except that milling of the sheet is continued, with periodic sampling for color measurements, until severe discoloration is induced.

The compositions can be tested for light stability by preparing specimens, as set forth above, and exposing them outdoors. Typical samples were prepared and sent to Florida. The specimens were mounted, with no supporting back, at a forty-five degree angle from the horizontal facing south. The exposure time is recorded in sun-hours, a sun-hour being a cumulative period of sixty minutes during which radiant energy amounts to as much as 0.823 gram-calories per square centimeter per minute. Clippings from the exposed samples are examined, after so many sun-hours, to determine whether shortcomings such as discoloration, spotting, stiffening or exudation had been induced by exposure to sunlight. An excessive degree of any one or a combination of these shortcomings constitutes failure.

In determining the plasticizing ability of the various epoxy compounds, amounts of the epoxide are incorporated into the vinyl chloride resin composition which would impart an arbitrary flexibility to the vinyl chloride resin composition. In this case, the selected flexibility was a modulus of 1000 pounds per square inch at 100 percent elongation as read from a stress-strain curve determined at 24.5° C. on a Scott L-6 tensile tester operating at a constant rate of elongation of four feet per minute. The amount of the epoxide required to impart the desired degree of flexibility is listed as the effectiveness in parts per 100 parts of resin. Mixtures of vinyl chloride resin composition and epoxy compound are fluxed for five minutes at 158° C., and samples from the resulting milled sheet were then compression molded for ten minutes at 158° C. to form suitable samples for testing.

In reporting the results of the evaluation of the composition certain symbols and abbreviations have been employed for the sake of simplicity and brevity. Accordingly, the following test methods, symbols and abbreviations, as used in the examples, are defined as follows:

(a) ASTM=American Society of Testing Materials.
(b) $T_F$ and $T_4$=points corresponding to 135,000 and 10,000 pounds per square inch respectively on a stiffness-temperature curve obtained in accordance with the procedure set forth in the manual of ASTM D1043–51.
(c) Brittle temperature ($T_B$)=the temperature obtained by means of low temperature impact test according to the procedure set forth in the manual of ASTM D746–52T.
(d) SPI volatility loss=value obtained in accordance with the procedure in the manual of ASTM D1203–52T.
(e) Durometer "A" hardness=an indentation measurement of hardness obtained with the Shore Durometer, "A" head.
(f) Sweat out=visual and manual examinations to detect any exudation of plasticizer that may appear as beads, a smear or a blush on the surface of the plasticized material. The observation is made after two weeks of aging at 25° C.
(g) Instron stiffness modulus=one hundred times the stress required to elongate a sample one percent as measured on an Instron Tensile Tester at room temperature (24° C.).
(h) Accelerated oil and water extraction:
Oil=films 4-mils thick are mounted between beds of glass beads and covered with preheated mineral oil. The test is run at 50° C. for a time sufficient to obtain between 3 and 10 percent weight loss. Oil extraction constant $k$ is calculated from:

$$k = \frac{W_1 - W_2}{a\sqrt{t}}$$

$W_1$=original weight (g.).
$W_2$=final weight (g.).
$a$=total area (square meters).
$t$=time (hours).
Water=films 4-mils thick are mounted between beds of water-washed activated carbon and covered with distilled water. The test is run at 70° C. for 24 hours. Percent weight loss of the films at the end of the test period is recorded.

The following examples describe processes of the invention involving the production of various novel compositions and are intended to serve merely as illustrations of the invention and are in no way intended to limit the scope of the invention.

EXAMPLE 1

*Preparation of 3-cyclohexene-1,1-dimethanol dioleate*

One mole of 3-cyclohexene-1,1-dimethanol (prepared according to French and Gallagher, J.A.C.S., 64, 1497 (1942).) and two mols of oleic acid (Emery Industries Grade 233LL Elaine) were refluxed in enough toluene to maintain a kettle temperature below 200° C. and water removed from the system through a decanter. The esterification was complete in 20 hours at 158–178° C. The toluene was removed in a "gooseneck" still to 250°/3 mm. Hg absolute. The acidity was too high and it was necessary to remove a fore fraction in a molecular still to obtain a residue product of low acidity possessing the following properties:

Viscous liquid.
Color _____ 8 Gardner
Ester _____percent__ 98.0
D 20/20 _____ 0.9247
N 30/D _____ 1.4735
Iodine No. _____ 86.0

EXAMPLE 2

*Preparation of 3,4-epoxycyclohexane-1,1-dimethanol bis(9,10-epoxystearate)*

Peracetic acid in acetone (6.15 mols, 2050 grams) was added dropwise to 1103 grams (1.64 mols) of 3-cyclohexene-1,1-dimethanol dioleate, with stirring, at a temperature in the range of from 45° C. to 50° C. over a period of 7 hours, whereupon the reaction mixture was stored in a refrigerator overnight. Stirring was continued at the same temperature for an additional period of 4½ hours until an analysis for peracetic acid indicated that 98 percent of the peracetic acid charged to the reaction had been consumed. The reaction mixture was then added dropwise into a reaction flask containing ethylbenzene under reflux. Acetic acid and other low boiling components were removed at the still head and provided 1222 grams of a residue product which analyzed 82.2 percent as the triepoxide by the pyridine-hydrochloride method; an iodine number of 0 and a saponification equivalent of 114 percent. The product had a 5.52 percent oxirane oxygen content and the yield was 85.1 percent of theory. An elemental analysis provided the following:

Carbon:
  Calc.=73.49 percent
  Found=72.54 and 72.47 percent
Hydrogen:
  Calc.=11.07 percent
  Found=10.65 and 10.76 percent

EXAMPLE 3

*Preparation of 3-cyclohexene-1,1-dimethanol di(10-undecenoate)*

One mol of 3-cyclohexene-1,1-dimethanol and 2 mols of 10-undecenoic acid were refluxed in sufficient toluene to maintain the kettle temperature below 200° C. and water was removed from the system through a decanter. After esterification was complete, the crude product was neutralized and low-boiling products were removed by distillation and the product accepted as a residue. The product was characterized by the following physical properties:

| | |
|---|---|
| Gardner color | ----- |
| Acidity | 0.130 |
| Ester _____percent | 98.3 |
| N 30/D | 1.4727 |
| D 20/20 | 0.9555 |

EXAMPLE 4

*Preparation of 3,4-epoxycyclohexane-1,1-dimethanol bis(10,11-epoxyundecanoate)*

A solution of 2.12 mols of peracetic acid in ethyl acetate was added dropwise, with stirring, over a period of one hour and 40 minutes at a temperature in the range of from 50° C. to 55° C. to 315 grams of 3-cyclohexene-1,1-dimethanol diundecenoate. Stirring was continued for an additional 3½ hours, whereupon an analysis for peracetic acid indicated that 94.8 percent of peracetic acid charged to the reaction had been consumed. The reaction mixture was stirred at a temperature of −11° C. for a period of 16 hours. The reaction mixture was removed from storage and passed through a steam stripper to remove ethyl acetate, acetic acid and other low boiling components, and there was obtained 333 grams of a viscous, yellow liquid residue product which analyzed 81.6 percent as 3,4-epoxycyclohexane-1,1-dimethanol bis(10,11-epoxyundecanoate) by the pyridine-hydrochloride method. The oxirane oxygen content of the product was 7.51 percent.

EXAMPLE 5

*Preparation of 3-cyclohexene-1,1-dimethanol dicrotonate*

One mol of 3-cyclohexene-1,1-dimethanol and 2 mols of crotonic acid were refluxed in toluene and the water formed during the reaction was removed through a decanter. After the esterification was complete, the crude product was neutralized and distilled under vacuum. The product was characterized by the following physical properties:

| | |
|---|---|
| Boiling point, °C./mm. Hg | 124/1.5 |
| Acidity | 0.039 |
| Ester _____percent | 97 |
| N 30/D | 1.4892 |
| D 20/20 | 1.0620 |
| Gardner color | 1 |

EXAMPLE 6

*Preparation of 3,4-epoxycyclohexane-1,1-dimethanol bis(2,3-epoxybutyrate)*

Two hundred forty grams of a 27.9 percent solution of peracetic acid in ethyl acetate were added dropwise over a period of one hour and 30 minutes to 65 grams (0.23 mol) of 3-cyclohexene-1,1-dimethanol dicrotonate at a temperature of 85° C. After the addition of the peracetic acid was complete, the reaction conditions were maintained for an additional 3 hours, whereupon an analysis for peracetic acid indicated that the peracetic acid had been consumed. The mixture was then cooled to −10° C. and added dropwise to an equal volume of ethylbenzene which was refluxing under 25 mm. of Hg. pressure absolute. The low-boiling components, such as ethyl acetate, acetic acid and ethylbenzene, were removed and there were obtained 90 grams of a residue product. The residue product was subjected to further refinement and there were obtained 84 grams of a product having an oxirane oxygen content of 4.83 percent.

EXAMPLE 7

*Epoxidation of tall oil fatty acid diester 3-cyclohexene-1,1-dimethanol*

Over a period of 3 hours, 360 grams of a 26.6 percent solution of peracetic acid in ethyl acetate was added dropwise to 360 grams of the tall oil fatty acid diester of 3-cyclohexene-1,1-dimethanol (prepared from a commercial grade of tall oil fatty acids having 47 percent linoleic acid, 51 percent oleic acid, 2 percent saturated acid, a specific gravity of 0.9048, a Gardner color of 3 and a viscosity (SSU, 100° F.) of 105 and 3-cyclohexene-1,1-dimethanol) at a temperature of from 50° C. to 55° C., with stirring. The reaction was allowed to proceed for an additional 1 hour and 15 minutes, at the end of which time an analysis for peracetic acid indicated that 98 percent of the peracetic acid charged to the reaction had been consumed. The reaction was allowed to proceed for an additional 30 minutes, whereupon it was passed through a steam-heated stripper maintained at a pressure of 35 mm. of Hg absolute. The residue from the stripper was mixed with 200 grams of ethylbenzene and again passed through the stripper while the pressure was maintained at 5 mm. of Hg absolute. The residue product was further purified by subjecting the same to an additional stripping at 5 mm. of Hg absolute and there was obtained 390 grams of epoxidized tall oil fatty acid diester 3-cyclohexene-1,1-dimethanol, having an oxirane oxygen content of 6.94 percent.

EXAMPLE 8

*Partial epoxidation of the tall oil fatty acid diester of 3-cyclohexene-1,1-dimethanol*

Over a period of 50 minutes, 298 grams of a 27.7 percent solution of peracetic acid in ethyl acetate was added dropwise to 359 grams of the tall oil acid diester 3-cyclohexene-1,1-dimethanol, described in Example 7, which was stirred at a temperature of 50° C. At the end of 15 minutes, an analysis for peracetic acid indicated that all of the peracetic acid charged to the reaction had been consumed, whereupon the reaction mixture was passed through a steam-heated stripper which was maintained at a pressure of 35 mm. of Hg absolute. The residue was then mixed with 400 cc. of ethylbenzene and recycled at 5 mm. of Hg absolute, and the residue was recycled again at the same pressure and there was obtained 374 grams of partially epoxidized tall oil fatty acid diester 3-cyclohexene-1,1-dimethanol having an oxirane oxygen content of 4.28 percent.

EXAMPLE 9

Recipes were prepared to test the performance of 3,4-epoxycyclohexane-1,1-dimethanol bis(9,10-epoxystearate) having an oxirane oxygen content of 5.52 percent as a heat and light stabilizer for a vinyl halide resin. The recipes comprised 100 parts of a vinyl chloride-vinyl acetate polymer resin containing from 96 to 98 percent vinyl chloride, various amounts of a commercial plasticizer, dioctyl phthalate, and various amounts of the aforementioned epoxide.

The amounts employed in the tests are reflected in Table 1.

All of the recipe compositions are subjected to heat and light stability tests in accordance with the procedures hereinbefore described. The results of the tests are summarized in the following Table 1:

TABLE I

| Test No. | Composition (parts) | | | Initial BLR, Percent | Mill stability—Minutes at 170° C. to— | | | | Light stability—Sun-Hours to Failure in Florida |
|---|---|---|---|---|---|---|---|---|---|
| | Resin | Dioctyl Phthalate | Epoxy Compound | | 80% BLR | 75% BLR | 60% BLR | 40% BLR | |
| 1 | 100 | 52.5 | 1.5 | 84 | 10 | 14 | 27 | 37 | 250 |
| 2 | 100 | 51 | 3 | 84 | 7 | 13 | 30 | 47 | 500 |
| 3 | 100 | 46.3 | 7.7 | 83 | 10 | 16 | 32 | 59 | 750 |
| 4 | 100 | 38.6 | 15.4 | 85 | 11 | 19 | 40 | 77 | 1,750 |
| 5 | 100 | | 54 | 80 | | 16 | 40 | 105 | 1,250 |

As may be observed, the employment of various amounts of epoxide increased the heat stability of the resin compositions containing the same from 37 minutes at 40% BLR to as high as 105 minutes at 40% BLR.

It may be also observed that the heat and light stabilizer of Example 1 is compatible with commercial type plasticizers such as dioctyl phthalate.

EXAMPLE 10

A recipe was prepared containing 100 parts of the resin described in Example 1, 0.5 percent by weight of dibutyl tin maleate as a stabilizer and amounts of 3,4-epoxycyclohexane-1,1-dimethanol bis(9,10-epoxystearate) having an oxirane oxygen content of 5.52 percent; as indicated in Table 2. The composition was fluxed on a heated differential two-roll mill. The surface temperature of the rolls was maintained at 158° C. After a period of five minutes the flux contents were removed from the mill and strips of the approximately 30 mil sheet were mounted on a stainless steel wire mesh screen which was then placed in a circulating oven maintained at a temperature of 158° C. The strips were removed from the oven at 30 minute intervals and discoloration, with respect to the original sheet, was noted. The discoloration was measured by means of a Photovolt Reflection Meter, Model 610, equipped with a Wratten C-5 blue filter. The physical properties of the plasticized resin composition were determined in accordance with the previously described procedures.

TABLE 2

| | | |
|---|---|---|
| Plasticizer, pphr | 53 | 75 |
| Plasticizer, Percent | 34.8 | 42.7 |
| Tensile, p.s.i. (24.5° C.) | 2,840 | 2,250 |
| Elongation, Percent (24.5° C.) | 290 | 355 |
| Load at 100% Elong., p.s.i. (24.5° C.) | 1,775 | 1,000 |
| Instron Stiffness modulus, p.s.i. (24.5° C.) | 1,775 | 660 |
| $T_F$, °C | −13 | −28 |
| $T_4$, °C | 12 | −4 |
| Brittle Temperature, °C | −9 | −20 |
| Extraction: Oil, K, 50° C | 5.2 | 15.6 |
| Durometer "A" Hardness (24.5° C.) | 80 | 62 |
| SPI Volatile Loss, Percent in 24 hrs. at 70° C | 0.4 | 0.4 |
| Heat Stability Data: | | |
| Initial Color, Percent BLR | | 81 |
| Min. at 158° C. to 80% BLR | | |
| Min. at 158° C. to 75% BLR | | 20 |
| Min. at 158° C. to 60% BLR | | 130 |
| Min. at 158° C. to 15% BLR | | 1,020 |
| Sweat-Out | | None |

EXAMPLE 11

Recipes were prepared comprising 100 parts of polyvinyl chloride containing 0.5 part of dibutyl tin maleate as a stabilizer and amounts of epoxidized tall oil fatty acid diesters of 3-cyclohexene-1,1-dimethanol having an oxirane oxygen content of 6.94 percent, as reflected in Table 3. The compositions were milled in accordance with the procedure outlined in Example 10 and tested.

The physical properties of the specimens are reflected in Table 3.

TABLE 3

| | | |
|---|---|---|
| Plasticizer, pphr | 53 | 77 |
| Plasticizer, Percent | 34.5 | 43.5 |
| Tensile, p.s.i. (24.5° C.) | 2,750 | 2,125 |
| Elongation, Percent (24.5° C.) | 235 | 385 |
| Load at 100% Elong., p.s.i. (24.5° C.) | 2,280 | 1,000 |
| Instron Stiffness Modulus, p.s.i. (24.5° C.) | 2,850 | 720 |
| $T_F$, °C | −1 | −16 |
| $T_4$, °C | 16 | 2 |
| Brittle Temperature, °C | −3 | −18 |
| Extraction: | | |
| Oil, K, 50° C | 0.8 | 1.6 |
| Water, Percent 24 hrs. at 70° C | 2.4 | 2.8 |
| Durometer "A" Hardness (24.5° C.) | 80 | 63 |
| SPI Volatile Loss, Percent in 24 hrs. at 70° C | 0.5 | 0.6 |
| Heat Stability Data: | | |
| Initial Color, Percent BLR | 70 | |
| Min. at 158° C. to 80% BLR | | |
| Min. at 158° C. to 75% BLR | | |
| Min. at 158° C. to 60% BLR | 11 | |
| Min. at 158° C. to 15% BLR | 420 | |
| Sweat-Out | None | |

EXAMPLE 12

Recipes were prepared comprising 100 parts of polyvinyl chloride containing 0.5 part of dibutyl tin maleate as a stabilizer and amounts of partially epoxidized tall fatty acid diesters of 3-cyclohexene-1,1-dimethanol having an oxirane oxygen content of 4.28 percent. The compositions were milled in accordance with the procedure outlined in Example 10 and tested. The physical properties of the specimens are reflected in Table 4.

TABLE 4

| | | |
|---|---|---|
| Plasticizer, pphr | 54 | 70 |
| Plasticizer, Percent | 35.1 | 41.2 |
| Tensile, p.s.i. (24.5° C.) | 2,525 | 2,040 |
| Elongation, Percent (24.5° C.) | 350 | 360 |
| Load at 100% Elong., p.s.i. (24.5° C.) | 1,550 | 1,000 |
| Instron Stiffness Modulus, p.s.i. (24.5° C.) | 3,000 | 1,100 |
| $T_F$, ° C | −22 | −32 |
| $T_4$, ° C | 11 | −5 |
| Brittle Temperature, ° C | −26 | −34 |
| Extraction: | | |
| Oil, K, 50° C | 1.8 | 3.2 |
| Water, Percent 24 hrs. at 70° C | 2.3 | 2.7 |
| Durometer "A" Hardness (24.5° C.) | 80 | 69 |
| SPI Volatile Loss, Percent in 24 hrs. at 70° C | 0.8 | 1.0 |
| Heat Stability Data: | | |
| Initial Color, Percent BLR | 64 | |
| Min. at 158° C. to 80% BLR | | |
| Min. at 158° C. to 75% BLR | | |
| Min. at 158° C. to 60% BLR | 7 | |
| Min. at 158° C. to 15% BLR | 480 | |
| Sweat-Out | None | None |

EXAMPLE 13

A recipe was prepared comprising 100 parts of polyvinyl chloride, 52 parts of 3,4-epoxycyclohexane-1,1-dimethanol bis(10,11-epoxyundecanoate) having an oxirane oxygen content of 7.5 percent and 0.5 part of dibutyl tin maleate as a stabilizer. The composition was fluxed on a heated differential two-roll mill. The surface temperature of the rolls was maintained at 158° C. After a period of five minutes the fluxed contents were removed from the mill and strips of the approximately 30 mil sheet were mounted on a stainless steel wire mesh screen which was then placed in a circulating air oven maintained at a temperature of 158° C. The strips were removed from the oven at 30 minute intervals and discoloration, with respect to the original sheet, was noted. The discoloration was measured by means of a Photovolt Reflection Meter, Model 610, equipped with a Wratten C-5 blue filter. The physical properties of the plasticized resin composition were determined in accordance with the previously-described procedure.

TABLE 5

| | |
|---|---|
| Plasticizer, pphr | 52 |
| Plasticizer, percent | 34.0 |
| Tensile, p.s.i. (24.5° C.) | 2620 |
| Elongation, percent (24.5° C.) | 280 |
| Load at 100% elong, p.s.i. (24.5° C.) | 1630 |
| Instron stiffness modulus, p.s.i. (24.5° C.) | 1004 |
| $T_F$, ° C. | −4 |
| $T_4$, ° C. | 12 |
| Brittle temperature, ° C. | −4 |

Extraction:
- Oil, K, 50° C. ............................. 0.8
- Water, percent in 24 hrs. at 70° C. ......... 1.9

Durometer "A" hardness (24.5° C.) ............. 74
SPI volatile loss, percent in 24 hrs. at 70° C. .... 0.3
Heat stability data:
- Initial color, percent BLR ................. 85
- Min. at 158° C. to 80% BLR ................. 21
- Min. at 158° C. to 75% BLR ................. 40
- Min. at 158° C. to 60% BLR ................. 120
- Min. at 158° C. to 15% BLR ................. 240

Sweat-out .................................... None

EXAMPLE 14

Recipes were prepared to test the performance of 3,4-epoxycyclohexane-1,1-dimethanol bis(2,3-epoxybutyrate) having an oxirane oxygen content of 4.83 percent as a heat stabilizer for a vinyl halide resin. The receipes comprised 100 parts of a polyvinyl chloride resin and amounts of a commercial plasticizer, dioctyl phthalate, and the aforementioned epoxide as shown in Table 6. All compositions were subjected to the heat stability tests in accordance with the procedures hereinbefore described. The results of the tests are summarized below:

TABLE 6

| Test No. | Composition (parts) | | | Initial BLR, Percent | Mill Stability—Minutes at 170° C. to— | | | |
|---|---|---|---|---|---|---|---|---|
| | Resin | Dioctyl Phthalate | Epoxy Compound | | 80% BLR | 75% BLR | 60% BLR | 40% BLR |
| 1 | 100 | 51.0 | 3.0 | 82 | 1 | 5 | 14 | 29 |
| 2 | 100 | 46.3 | 7.7 | 80 | | 7 | 25 | 47 |
| 3 | 100 | 38.6 | 15.4 | 82 | 1 | 4 | 15 | 28 |
| 4 | 100 | 54.0 | | 78 | | 1 | 3 | 7 |

EXAMPLE 15

Recipes were prepared to test the performance of 3,4-epoxycyclohexane-1,1-dimethanol bis(10,11-epoxyundecanoate) having an oxirane oxygen content of 7.5 percent as a heat stabilizer for a vinyl halide resin. The recipes comprised 100 parts of a polyvinyl chloride resin and amounts of a commercial plasticizer, dioctyl phthalate, and the aforementioned epoxide as shown in Table 7. All compositions were subjected to the heat stability tests in accordance with the procedures hereinbefore described. The results of the tests are summarized below:

TABLE 7

| Test No. | Composition (parts) | | | Initial BLR, Percent | Mill Stability—Minutes at 170° C. to— | | | | Light Stability—Sun-Hours to Failure in Florida |
|---|---|---|---|---|---|---|---|---|---|
| | Resin | Dioctyl Phthalate | Epoxy Compound | | 80% BLR | 75% BLR | 60% BLR | 40% BLR | |
| 1 | 100 | 52.5 | 1.5 | 82 | 1 | 4 | 14 | 29 | 250 |
| 2 | 100 | 51.0 | 3.0 | 82 | 1 | 5 | 13 | 30 | >500 |
| 3 | 100 | 46.3 | 7.7 | 85 | 5 | 10 | 20 | 40 | >500 |
| 4 | 100 | 38.6 | 15.4 | 83 | 2 | 7 | 17 | 37 | >500 |
| 5 | 100 | | 54.0 | 85 | 5 | 10 | 22 | 40 | >500 |
| 6 | 100 | 54.0 | | 78 | | 1 | 3 | 7 | 100 |

EXAMPLE 16

Recipes were prepared to test the performance of tall oil acid esters of 3,4-epoxycyclohexane-1,1-dimethanol having an oxirane oxygen content of 6.94 percent as a heat stabilizer for a vinyl halide resin. The recipes comprised 100 parts of a polyvinyl chloride resin and amounts of a commercial plasticizer, dioctyl phthalate, and the aforementioned epoxide as shown in Table 8. All compositions were subjected to the heat stability tests in accordance with the procedures hereinbefore described. The results of the tests are summarized below:

TABLE 8

| Test No. | Composition (parts) | | | Initial BLR, Percent | Mill Stability—Minutes at 170° C. to— | | | |
|---|---|---|---|---|---|---|---|---|
| | Resin | Dioctyl Phthalate | Epoxy Compound | | 80% BLR | 75% BLR | 60% BLR | 40% BLR |
| 1 | 100 | 52.5 | 1.5 | 83 | 2 | 6 | 16 | 50 |
| 2 | 100 | 51.0 | 3.0 | 80 | -------- | 4 | 16 | 50 |
| 3 | 100 | 46.3 | 7.7 | 79 | -------- | 8 | 21 | 50 |

EXAMPLE 17

Recipes were prepared to test the performance of partially epoxidized tall oil acid diesters of 3-cyclohexene-1,1-dimethanol having an oxirane oxygen content of 4.28 percent as a heat stabilizer for a vinyl halide resin. The recipes comprised 100 parts of a polyvinyl chloride resin and amounts of a commercial plasticizer, dioctyl phthalate, and the aforementioned epoxide as shown in Table 9. All compositions were subjected to the heat stability tests in accordance with the procedures hereinbefore described. The results of the tests are summarized below:

TABLE 9

| Test No. | Composition (parts) | | | Initial BLR, Percent | Mill Stability—Minutes at 170° C. to— | | | |
|---|---|---|---|---|---|---|---|---|
| | Resin | Dioctyl Phthalate | Epoxy Compound | | 80% BLR | 75% BLR | 60% BLR | 40% BLR |
| 1 | 100 | 52.5 | 1.5 | 80 | -------- | 4 | 15 | 40 |
| 2 | 100 | 51.0 | 3.0 | 79 | -------- | 6 | 16 | 50 |
| 3 | 100 | 46.3 | 7.7 | 81 | 1 | 7 | 19 | 47 |

What is claimed is:

1. A vinyl chloride composition comprising a vinyl chloride resin containing compounds of the class characterized by the general formula:

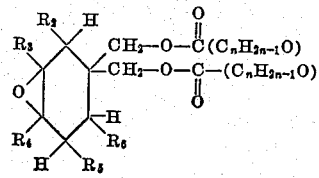

wherein $R_2$ through $R_6$ represent members selected from the group consisting of hydrogen atoms and lower alkyl groups and the groups $C_nH_{2n-1}O$ each, respectively and separately represent epoxyalkyl groups composed of carbon, hydrogen and one oxygen atom attached to vicinal carbon atoms containing $n$ carbon atoms, $n$-1 hydrogen atoms wherein $n$ represents a positive integer in the range of from 2 through 17.

2. A vinyl chloride composition comprising a vinyl chloride resin containing 3,4-epoxycyclohexane-1,1-dimethanol bis(9,10-epoxystearate).

3. A vinyl chloride composition comprising a vinyl chloride resin containing epoxidized tall oil fatty acid diesters of 3-cyclohexene-1,1-dimethanol.

4. A vinyl chloride composition comprising a vinyl chloride resin containing 3,4-epoxycyclohexane-1,1-dimethanol bis(10,11-epoxyundecanoate).

5. A vinyl chloride composition comprising a vinyl chloride resin containing 3,4-epoxycyclohexane-1,1-dimethanol bis(2,3-epoxybutyrate).

References Cited in the file of this patent

UNITED STATES PATENTS 2,786,067   Frostick et al. _____ Mar. 19, 1957